(12) United States Patent
Mesarina et al.

(10) Patent No.: US 8,984,500 B2
(45) Date of Patent: Mar. 17, 2015

(54) PROGRAMMING A COMPUTING NODE CONNECTED TO A SENSOR AND AN ACTUATOR

(75) Inventors: Malena Mesarina, Menlo Park, CA (US); Salil Pradhan, Santa Clara, CA (US); Bill Serra, Montara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 3471 days.

(21) Appl. No.: 10/866,143

(22) Filed: Jun. 14, 2004

(65) Prior Publication Data

US 2006/0031426 A1 Feb. 9, 2006

(51) Int. Cl.
| | | |
|---|---|---|
| G06F 9/44 | (2006.01) | |
| H04L 29/08 | (2006.01) | |
| G01D 21/00 | (2006.01) | |
| G08B 25/00 | (2006.01) | |
| G08B 29/16 | (2006.01) | |

(52) U.S. Cl.
CPC .............. *H04L 67/34* (2013.01); *G01D 21/00* (2013.01); *G08B 25/009* (2013.01); *G08B 29/16* (2013.01); *H04L 67/025* (2013.01); *H04L 67/125* (2013.01); *H04L 67/02* (2013.01); *H04L 67/18* (2013.01); *H04L 69/329* (2013.01); *H04L 67/04* (2013.01)
USPC ........................................................ 717/168

(58) Field of Classification Search
None
See application file for complete search history.

(56) References Cited

U.S. PATENT DOCUMENTS

| | | | | |
|---|---|---|---|---|
| 4,427,968 | A | * | 1/1984 | York ........................ 340/310.11 |
| 5,461,617 | A | * | 10/1995 | Takebe et al. ................. 370/470 |
| 5,910,799 | A | * | 6/1999 | Carpenter et al. ............ 715/866 |
| 6,173,207 | B1 | * | 1/2001 | Eidson ............................ 700/14 |
| 6,253,125 | B1 | * | 6/2001 | Barker ............................ 701/13 |
| 6,504,503 | B1 | | 1/2003 | Saint-Hilaire et al. |
| 6,522,664 | B1 | * | 2/2003 | Kawahara ..................... 370/466 |
| 6,956,826 | B1 | * | 10/2005 | Binder .......................... 370/254 |
| 6,973,301 | B1 | * | 12/2005 | Contino et al. ............... 455/419 |
| 7,017,861 | B1 | * | 3/2006 | Johansson et al. ............ 244/194 |
| 7,294,105 | B1 | * | 11/2007 | Islam ............................ 600/300 |
| 2002/0052719 | A1 | | 5/2002 | Alexander et al. |
| 2004/0003073 | A1 | | 1/2004 | Krzyzanowski et al. |
| 2004/0008113 | A1 | | 1/2004 | Pradhan et al. |
| 2004/0090329 | A1 | * | 5/2004 | Hitt ............................... 340/552 |
| 2004/0100394 | A1 | * | 5/2004 | Hitt .......................... 340/870.11 |
| 2005/0256876 | A1 | * | 11/2005 | Eidson ............................ 707/10 |
| 2005/0259602 | A1 | * | 11/2005 | Binder .......................... 370/296 |

OTHER PUBLICATIONS

Malena Mesarina et al—"A Self-Configuring Sensing System for Data Centers"—Lecture Notes in Computer Science vol. 2867 Jan. 2004—pp. 200-201.

* cited by examiner

*Primary Examiner* — Li B Zhen
*Assistant Examiner* — Evral Bodden

(57) ABSTRACT

A computing node is connected to a sensor and an actuator. The computing node receives a module which is used to program the computing node to perform a function associated with the sensor and the actuator.

28 Claims, 7 Drawing Sheets

PROGRAMMING A COMPUTING NODE CONNECTED TO A SENSOR AND AN ACTUATOR

TECHNICAL FIELD

The technical field relates generally to programming a computing node connected to a sensor and an actuator.

BACKGROUND

Sensors are used for a variety of applications in a large number of industries and systems, such as for measuring and testing systems, safety and security systems, and even in computer chips for monitoring computer resources. For some of the more complex systems, sensors are connected to a central computer for controlling actuators. For example, in a building security system a central computer in the lobby may be connected to horns or other audio actuators throughout the building. A sensor, which may be located anywhere in the building, detects an intruder and transmits the detected information to the central computer. The central computer then activates the horns or other audio actuators.

These types of sensor systems utilizing a central computer are widely used for a variety of applications but tend to be expensive to install. For example, installation may require wiring a large structure, such as a building, using the sensor system, which can be very costly. In addition, during operation the central computer system may receive and process data from a large number of sensors. Thus, the central computer becomes a bottleneck, which may delay data processing and thus delay control of actuators in the system.

SUMMARY

According to an embodiment, a computing node is connected to a sensor and an actuator. The computing node receives a module which is used to program the computing node to perform a function associated with the sensor and the actuator.

BRIEF DESCRIPTION OF THE DRAWINGS

The embodiments are illustrated by way of example and not limitation in the accompanying figures in which like numeral references refer to like elements, and wherein.

DETAILED DESCRIPTION OF EMBODIMENTS

For simplicity and illustrative purposes, the principles of the embodiments are described. Moreover, in the following detailed description, references are made to the accompanying figures, which illustrate specific embodiments. Electrical, mechanical, logical and structural changes may be made to the embodiments without departing from the spirit and scope of the embodiments.

According to an embodiment, a distributed processing system is implemented using a plurality of computing nodes connected to sensor networks including sensors and actuators. Each computing node may be programmed by transmitting modules to the computing nodes. A module may include at least one function and at least one relationship. The relationship identifies an association between a producer of data and a consumer of the data. For example, the relationship identifies a sensor generating sensor data and an actuator controlled by a computing node based on the sensor data. The function designates a processing function for processing the sensor.

Figure 1:
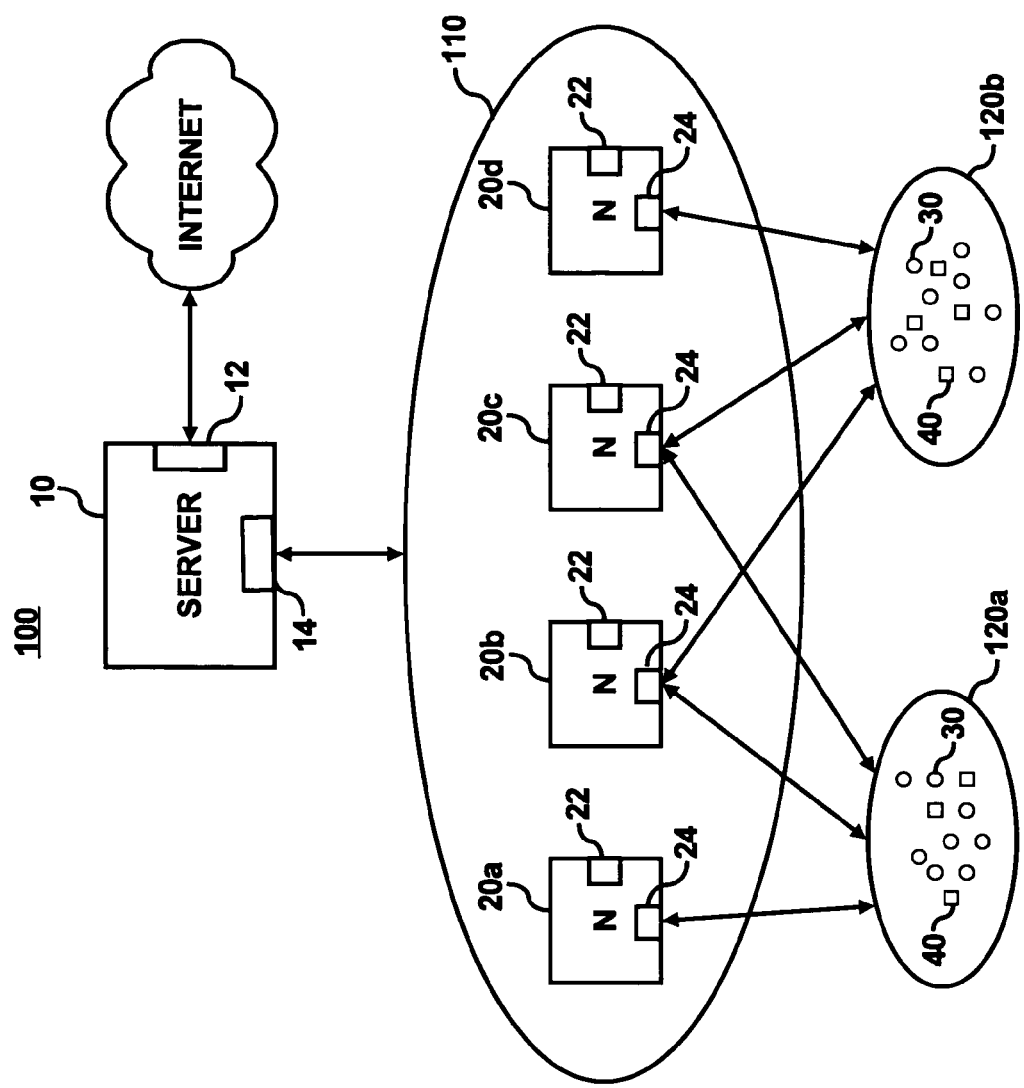
FIG. 1 illustrates a block diagram of a system including computing nodes, sensors, and actuators, according to an embodiment.

FIG. 1 illustrates a sensor system 100, according to an embodiment, which includes computing nodes 20 that may be programmed by a server 10 using modules. The system 100 includes the server 10, a wireless computing node network 110, and wireless sensor networks 120a and 120b. The server 10 may include a wide area network (WAN) interface 12 for connecting the server 10 to a WAN, which may include the Internet. For example, the server 10 may receive scripts for programming the computing nodes 20 via the Internet. The scripts are compiled at the server 10 to generate modules including functions and relationships for programming the computing nodes 20.

In addition to the WAN interface 12, the server 10 may include a local area network (LAN) interface connecting the server 10 to the computing node network 110. The computing node network 110 includes the computing nodes 20 connected via one or more wireless networks. A computing node is a device operable to perform a function using information received from a sensor, i.e., sensor data. The function may be designated by a module received from the server 10. For example, the computing node 20a receives temperature data from sensors in the sensor network 120a and performs a function, such as comparing sensed temperatures from the temperature data to a threshold. The computing node 20a controls an actuator in the sensor network 120a, such as a cooling pump, to increase the volume of cooling fluid in an air conditioning system if temperatures are above the threshold.

The computing nodes 20 may include two types of wireless network interfaces. One type of wireless network interface 22 may be used to connect to the wireless network in the computing node network 110. The wireless network interface 22 may be used to communicate with other computing nodes or possibly the server 10 to receive modules. The computing nodes 20 may also include a second type of wireless network interface 24 for connecting to the sensor networks 120. For example, the sensor networks 120 may include a low-power wireless network that may utilize a wireless protocol different from the computing node network 110. Thus two network interfaces 22 and 24 may be used in each of the computing nodes 120. However, it will be apparent to one of ordinary skill in the art that a single wireless network interface may be used if it is compatible with both the computing node network 110 and the sensor networks 120.

The sensor networks 120, shown as 120a and 120b, include a plurality of sensors 30 and actuators 40. A sensor includes a device operable to measure or respond to a physical stimulus, such as temperature, light, sound, etc. A sensor may be operable to detect a condition associated with an environment in a vicinity of the sensor. Examples of sensors may include temperature, ultrasound, infrared, cameras, etc. An actuator is a device that is operable to move or control another device. Examples of actuators may include automatic doors, audible alarms, visual alarms, communications devices operable to send a communication in response to a sensor detecting an event, and almost any type of mechanical device.

The sensors 30 and the actuators 40 are connected via a wireless network to the computing nodes 20. "Connected" as used herein means electrically coupled. A connection may be a direct connection or a connection via one or more components. For example, the sensors 30 and the actuators 40 may be connected to the computing nodes via a wireless network, which may include one or more network components. One or more of the sensors 30 and the actuators 40 may also be connected to the computing nodes 20 directly, such as via a USB port or serial port. These types of sensors and actuators are referred to as "local". The wireless network may be a low-power wireless network with a smaller range than the wireless network used in the computing network 110. For example, the sensors 30 and actuators 40 may include battery operated devices, and thus a low-power wireless network may be used to conserve energy and maximize battery life.

The computing nodes 20 may perform a discovery process to identify the sensors and actuators connected thereto. For example, the computing node 20a broadcasts discovery messages to all the sensors and actuators within its transmission range within the sensor networks 120. The computing node 20a determines the sensors and actuators connected to the computing node 20a based on the messages received from sensors and actuators in response to the discovery message.

The computing nodes 20 may also determine location information for themselves. In one embodiment, the location information may be automatically determined using location-aware sensors, such as described in U.S. patent application Ser. No. 10/620,272, filed Jul. 9, 2003 and entitled "Location Aware Sensor Nodes" by Pradhan et al., which is assigned to the assignee of the present invention and is incorporated by reference in its entirety. Location information may also be determined using known sensor, such as global positioning system (GPS) sensors. Alternatively, location information may be predetermined during installation and stored in the computing nodes 20 and/or the server 10.

The location information for a computing node and information associated with the sensors and actuators connected to the computing node may be used by the server 10 to program the computing node. For example, a computing node transmits location information and sensor and actuator information associated with the computing node to the server 10. Based on this information, the server 10 determines a room type associated with the computing node and transmits modules associated with the room type to the computing node. The server 10 maps the modules to room types and based on the mapping identifies and transmits associated modules to the computing nodes 20 for programming the computing nodes 20. The mapping function is described in detail below with respect to FIG. 2.

FIG. 1 illustrates one computing node network 110 and two sensor networks 120 for purposes of illustrating the embodiments. It will be apparent to one of ordinary skill in the art that the system 100 may include one or a plurality of computing node networks sensor networks. Other variations of the system 100 may include wired networks as well as wireless networks. Furthermore, the server 10 may be connected to the computing node network 110 via a LAN or the Internet for transmitting modules to the computing nodes 20. The LAN may include a wireless network and/or a wired network.

The system 100 includes a distributed processing network in that processing of sensor data may be performed at each of the computing nodes 20 instead of only at a central location. The computing nodes 20 are programmed with modules received from the server 10. The modules designate the functions to be performed by a computing node. A module may include a complete program or a separate unit of a program, like an object, that is used with other modules or a program to perform the function designated in the module.

The server 10 may store a plurality of modules including functions to be performed by different computing nodes and including relationships between sensors and actuators. The server 10 identifies one or more of the stored modules associated with a particular computing node and transmits the associated modules to the computing node for programming the computing node. This is further illustrated with respect to FIG. 2.

Figure 2:
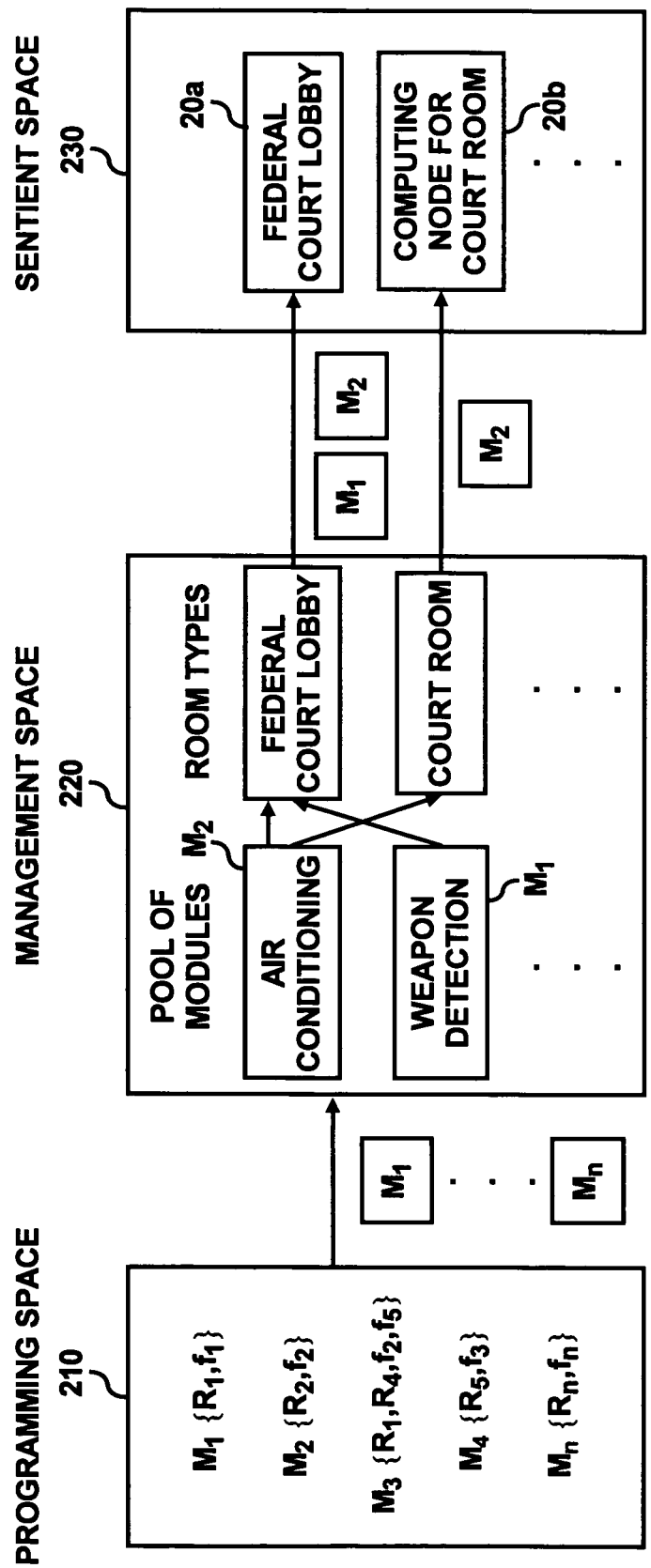
FIG. 2 shows a logical illustration of the architecture of the system shown in FIG. 1, according to an embodiment.

FIG. 2 shows a logical illustration of the architecture of the system 100. The architecture includes a programming space 210, a management space 220, and a sentient space 230. The programming space 210 includes the modules M1 . . . Mn, which may be stored in the server 10 shown in FIG. 1. The modules include relationships R1 . . . n and functions f1 . . . n. A relationship designates a relationship between a producer of data, such as a sensor, and a consumer of the data, such as an actuator or a computing node. A function designates the operation or process performed by a computing node. For example, the system 100 is provided in a federal court house. The module M1 is a weapon detection module. The module M1 includes a relationship R1 and a function f1. The relationship R1 associates the metal detector sensor type with an automatic door actuator. The function f1 is a weapon detection function that generates an instruction to control a door actuator to close an automatic door if a weapon is detected. A script in a meta language for programming the module M1 may include the following:

If detect(m) then d.close;
Where, m=metal detector sensor,
d=door close switch actuator,
detect( )=function that processes sensor data from m and outputs 1 if a weapon is detected.

The script may be compiled at the server 10 to generate the module M1 including a list of relationships between sensors and actuators and the processing function, such as the following:

m→d: m generates sensor data to be processed to control d;
f(m): the processing function that describes how to process sensor data from m.

The module M1 shown above includes one relationship and function by way of example and not limitation. A module may have a plurality of relationships and functions. Generally, an administrator can describe actions that need to occur, such as control of actuators, when certain events are detected by the sensors by using a simple script language, such as shown above with respect to the script for the module M1. A script is compiled to generate a module for programming computing nodes that need to perform functions designated in the module. The module may include instructions for processing sensor data in the computing nodes to control actuators.

The management space 220 includes mapping of modules to room types for determining which room types are associated with each of the computing nodes 20. Room type is associated with the location and/or function of a computing node. For example, the computing node 20a may be provided in a sensor system installed in a building. The computing node 20a transmits its location information and the sensors and actuators that are connected to the computing node 20a to the server 10. The server 10 determines that the computing node 20a is in a lobby based on its location and then assigns the computing node 20a to the lobby room type. If the computing node 20a is moved or is mobile, then new location information is transmitted to the server 10. The server 10 may also consider the sensor type and actuator type of the sensors and actuators connected to the computing node 20a or a combination of sensor and actuator type and location of the computing node 20a when assigning room type. For example, if the server 10 determines that the computing node 20a is connected to metal detection sensors and automatic door actuators and the computing node 20a is in the vicinity of a lobby, then the server 10 assigns the lobby room type to the computing node 20a. That is the server 10 may assume the functions of the computing node 20a based on the sensors and actuators connected thereto. In this example, the assumed functions are associated with sensors and actuators typically used in the lobby.

Assigning modules to computing nodes is further illustrated in the management space 220 shown in FIG. 2. In the example shown in FIG. 2, the server 10 assigns the computing node 20a to the lobby room type and the computing node 20b to the court room room type based, for example, on the locations of the computing nodes 20a and 20b and possibly the functions to be performed by these computing nodes.

The server 10 maps the weapon detection module M1 to the lobbies of the federal court house, i.e., lobby room type, and the server 10 maps the module M2, such as an air-conditioning control module, to the lobbies and the court rooms of the federal court house, i.e., the lobby and court room room types. The mapping of modules to room types may be predetermined and stored in the server 10. For example, the server 10 may store the modules M1 . . . Mn and may store a mapping table or a database associating modules to room types. In one example, the modules M1 . . . Mn include mapping information identifying associated room types. The server 10 reads the mapping information and stores the related one or more room types for each module in the mapping table or database.

Based on the mapping of the modules M1 . . . Mn to room types and the assigned room type for the computing nodes 20a and 20b, the server 10 identifies that the modules M1 and M2 are associated with the computing node 20a and that the module M2 is associated with the computing node 20b. The server 10 transmits the modules M1 and M2 to the computing node 20a and transmits the module M2 to the computing node 20b.

The sentient space 230 shown in FIG. 2 includes the computing nodes 20 with the modules received from the server 10. For example, the computing node 20a receives the modules M1 and M2 from the server 10 and installs the modules M1 and M2. Similarly, the computing node 20b installs the module M2. Thus, the computing nodes 20a and 20b are programmed to perform the functions designated in the modules M1 and M2. By programming the computing nodes 20 using the system architecture shown in FIG. 2, the computing nodes 20 may be programmed in groups rather than individually.

After installation of the computing nodes 20, each of the computing nodes 20 may be programmed by receiving and installing associated modules. Also, after installation, the server 10 may identify new modules or updates to previously installed modules for transmission to the computing nodes 20.

The sentient space 230, in addition to including the computing nodes 20 programmed with the modules M1 . . . Mn, can be used to guide the grouping of the sensors 30 and the actuators 40 based on the relationships R1 . . . Rn provided in the modules and to guide the assignment of functions f1 . . . fn to the computing nodes 20. For example, a computing node determines which sensors and actuators to communicate with based on the relationships in the modules for the computing node and determines which functions to perform based on functions in the modules. However, when there is a level of redundancy, such as when two or more computing nodes may perform the same functions possibly using the same actuators and sensors, a computing node has the option of either executing a redundant function designated in a module or leaving the execution to another computing node. This decision may be based on the availability of computing resources at a computing node and runtime conditions in the wireless networks. Computing resources may be hardware or software in the computing node and the availability of computing resources may be based on the performance of the hardware or software. Examples of computing resources may include processor speed, processor availability to perform functions, storage capacity, etc. Runtime conditions are conditions that may affect the processing of sensor data and control of actuators. Runtime conditions may be associated with transmitting sensor data or transmitting commands for controlling actuators in the wireless networks, such as bit error rate on a communication channel, bandwidth, delay, etc. Another example of a runtime condition may be remaining battery life for a sensor, actuator, or even a computing node, although the computing nodes may typically be powered by an AC source.

Figure 3:
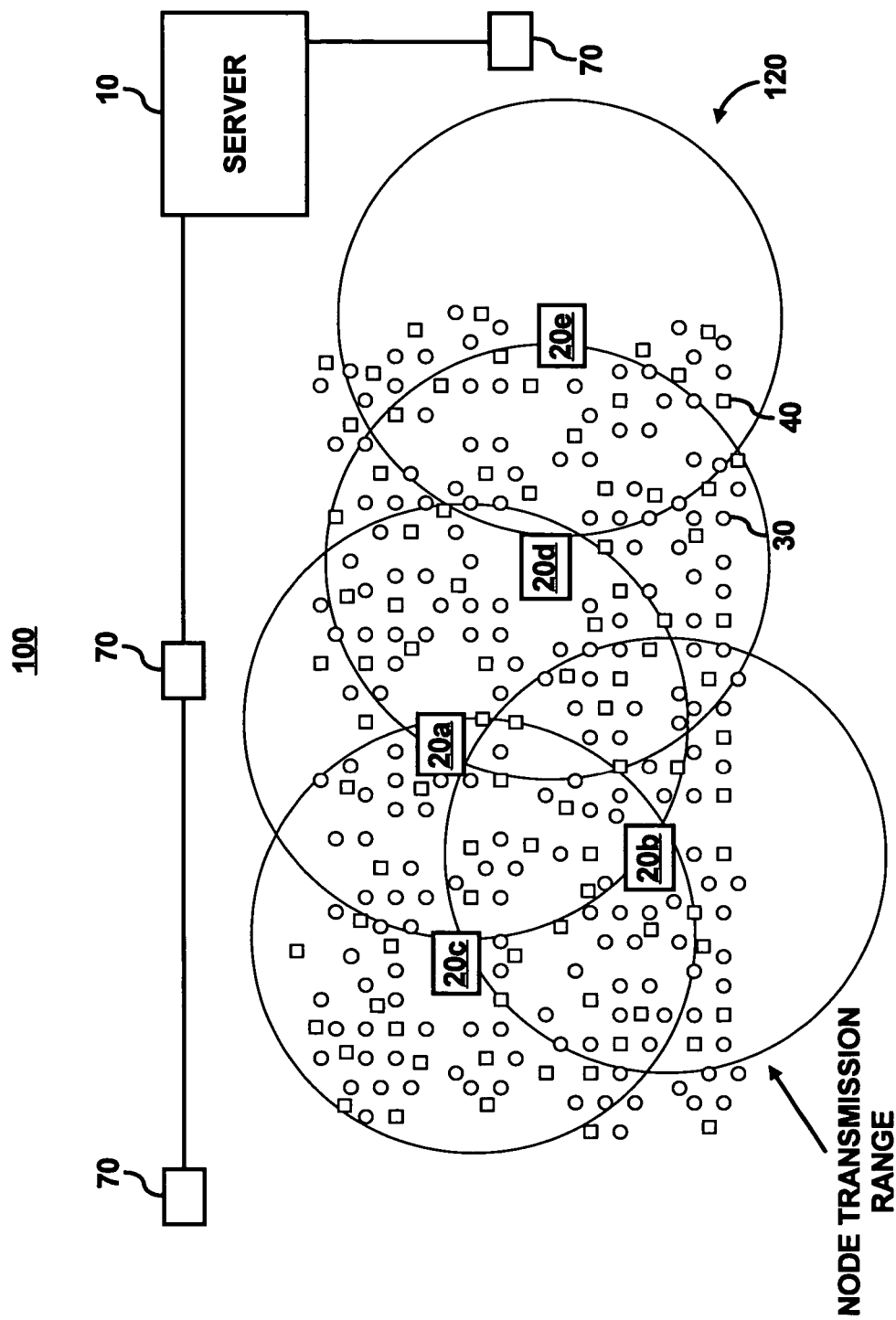
FIG. 3 illustrates a wireless network in the system shown in FIG. 1, according to an embodiment.

To further illustrate the functionality of the sentient space 230, FIG. 3 shows the transmission ranges of the computing nodes 20 in the computing node network 110 of FIG. 1. The computing nodes 20 have relatively large communication ranges that allow them to communicate with other computing nodes 20 in the computing node network 110. The overlap in transmission ranges can be used for routing. Although not shown, more computing nodes 20 are included in the system 100 such that one or more computing nodes 20 have a transmission range that encompasses access points 70. The access points 70 may be connected via a wired network to the server 10, however a wireless network may also be used. Transmission ranges for the sensor networks 120a and 120b are not shown, but may not be as large, especially for sensors that are battery operated.

The computing nodes 20 may broadcast to each other their installed modules, which include the functions and relationships for a respective computing node. Also, a computing node may store the functions performed by other computing nodes and the relationships associated with other computing nodes. Table I below illustrates a table that may be stored in the computing node 20a that can be used to identify the functions and relationships of other computing nodes in the computing node network 110.

TABLE I

| Computing Node ID | Functions | Relationships |
|---|---|---|
| 20a | f1, f2, f5 | R1, R2, R5 |
| 20b | f2 | R2 |
| 20c | f2, f4 | R2, R4 |
| 20d | f1, f2, f6 | R1, R2, R6 |
| 20e | f6 | R6 |

By storing the functions and relationships associated with other computing nodes, such as using table I or another storage format, the computing node 20a can identify a level of redundancy for functions and relationships. For example, from table I the computing node 20a determines that the computing node 20d provides redundant functions, such as the functions f1 and f2, for the relationships R1 and R2. Thus, the computing node 20a may decide not to execute the functions f1 or f2 for the relationships R1 and R2 if computing resources are unavailable or if routing conditions may result in transmission errors.

As an example, assume the computing nodes 20a and 20d are for the lobby room type. The computing nodes 20a and 20d are both programmed with the module M1 which includes the relationship R1, associating the metal detector sensor type with an automatic door actuator type, and the function f1, including a weapon detection function that, for example, generates an instruction to control the door actuator to close an automatic door if a weapon is detected using a metal detector sensor for the lobby. The computing nodes 20a and 20d decide from which metal detector sensors to collect data, and whether to process the sensor data and to transmit sensor data or commands in the computing node network 110. These decisions are based on the availability of computing resources and runtime conditions, and whether redundant functionality is provided by another computing node. For example, if the computing node 20a determines that a communications channel with particular metal detection sensors has a high bit error rate, the computing node 20a may decide not to collect and process data from those sensors until the channel becomes more stable. Also, if the computing node 20a determines that remaining battery life is below a threshold, the computing node 20a may warm a central system of its impending condition and wait for the battery to be recharged before beginning to process data. Because the computing node 20d provides the same functionality as the computing node 20a, one of the computing nodes 20a or 20d may decide not to perform the function f1 without substantially affecting the system 100.

In addition, the computing node 20a may consider other factors associated with the computing node 20d when determining whether redundant functionality exists. For example, the computing node 20a already determined that the computing node 20d is operable to also execute the function f1. However, the computing node 20a may also estimate whether the computing node 20d communicates with the same sensors and actuators to provide the redundant functionality for the function f1. For example, the computing node 20a may be associated with sensors and actuators for a north lobby while the computing node 20d may be associated with sensors and actuators for a south lobby in a large building. Thus, the computing node 20d may not necessarily control or communicate with the same sensors and actuators as the computing node 20a. Accordingly, the computing node 20a may identify the sensors and actuators controlled by the computing node 20d, for example, by exchanging IDs for the sensors and actuators connected thereto or the computing node 20a may compare its location to the location of the computing node 20d. If the distance between the computing nodes is below a threshold, then the computing node 20a may determine that the computing node 20d substantially communicates with the same sensors and actuators.

Figure 4:
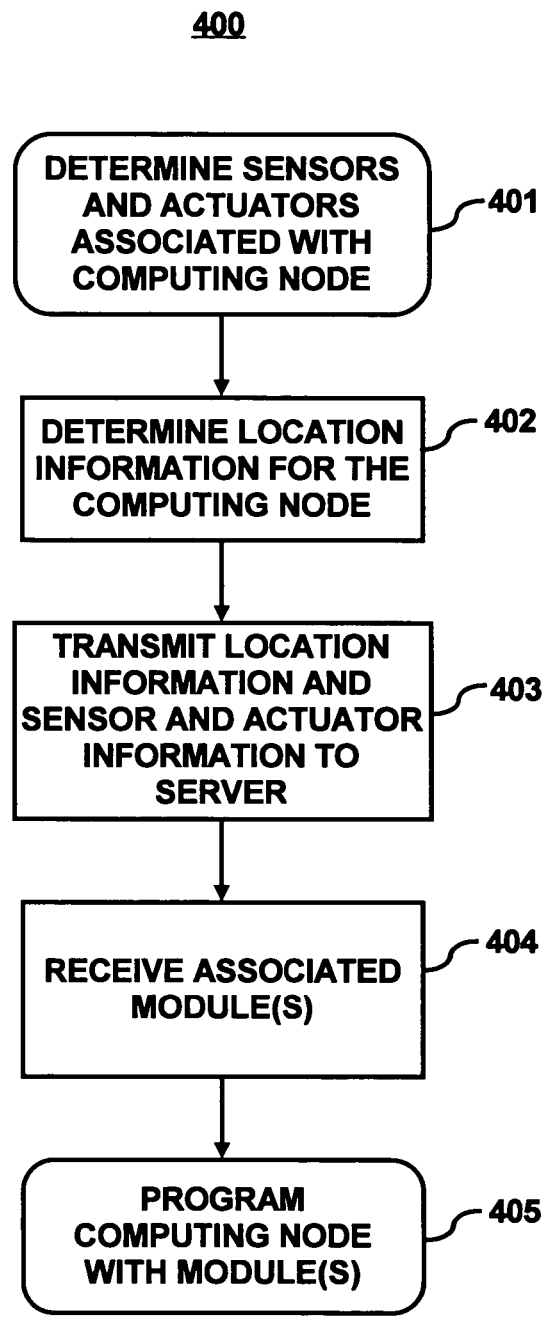
FIG. 4 illustrates a flow chart of a method for programming a computing node, according to an embodiment.

FIG. 4 illustrates a method 400 for programming a computing node, according to an embodiment. The method 400 is described with respect to the system 100 shown in FIGS. 1 and 2 by way of example and not limitation. Furthermore, one or more of the steps of the method 400 may be performed by software, hardware or a combination thereof.

At step 401, a computing node, such as the computing node 20a shown in FIG. 1, determines sensors and actuators information associated with the node. For example, the computing node 20a performs a discovery process to identify sensors and actuators within transmission range. This may include broadcasting a discovery message via the wireless network interface 24 to sensors and actuators in the sensor networks 120a and 120b. Any sensors and actuators receiving the discovery message may respond with an ACK message including, for example, an ID and possibly sensor type or actuator type.

At step 402, the computing node 20a determines location information for the computing node 20a. In one example, the location information may be predetermined and stored in the computing node 20a, such as when installed. In another example, the location information may be automatically determined using location-aware sensors, such as described in U.S. patent application Ser. No. 10/620,272, incorporated by reference above, or by using well known sensors, such as GPS sensors. The location information may include geographic location, such as location in a three-dimensional coordinate space, or it may include location in a predetermined area, such as location in a building.

At step 403, the computing node 20a transmits the sensor and actuator information and location information for the computing node 20a to the server 10.

At step 404, the computing node 20a receives modules associated with the computing node 20a. For example, the server 10 uses the location information and/or the sensor and actuator information to identify modules associated with the computing node 20a, such as the modules M1 and M2 shown in FIG. 2. The server 10 then transmits the associated modules to the computing node 20a. The steps performed by the server 10 for identifying the associated modules are described in detail below with respect to the method 600.

At step 405, the computing node 20a is programmed using the modules received from the server 10. Programming the computing node 20a with the modules may include compiling, installing, and/or executing the modules. The computing node 20a then uses the modules to process sensor data and control actuators based on the results of the processing.

Figure 5:
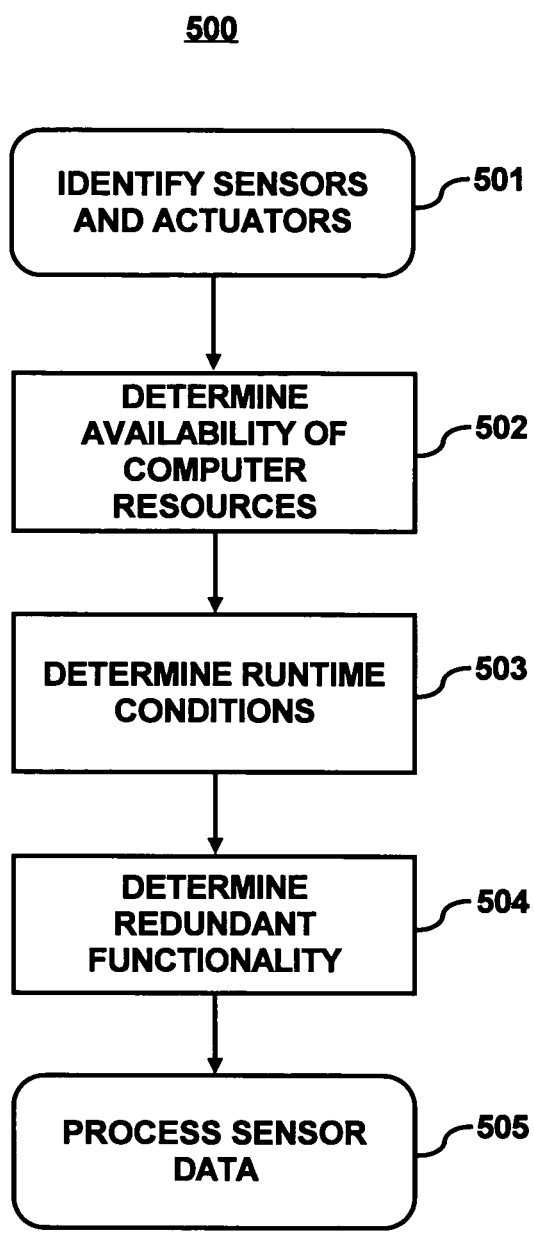
FIG. 5 illustrates a flow chart of a method of determining whether to process sensor data, according to an embodiment.

FIG. 5 illustrates a method 500 for determining whether to execute functions, according to an embodiment. The method 500 is described with respect to FIGS. 1-3 by way of example and not limitation. Furthermore, one or more of the steps of the method 500 may be performed by software, hardware or a combination thereof.

At step 501, a computing node identifies sensors and actuators for receiving and sending data. For example, the computing nodes 20a receives a module M1 from the server 10, which includes a relationship R1 and a function f1 such as shown in FIG. 2. The relationship R1 may identify related sensors and actuators, such as metal detector sensors and automatic door actuators. The computing node 20a identifies metal detection sensors in the sensor networks 120 shown in FIGS. 1 and 3 within a transmission range of the computing node 20a. The computing node 20a similarly identifies automatic door actuators within the transmission range of the computing node 20a in the sensor networks 120.

At step 502, the computing node 20a determines availability of computing resources. Computing resources may be hardware or software in the computing node and the availability of computing resources may be based on the performance of the hardware or software. Examples of computing resources may include processor speed, processing capacity, storage capacity, etc. If a computing resource falls below a predetermined threshold, then the computing resource may be unavailable and the computing node 20a may delay or forgo processing sensor data using, for example, the function f1 provided in the module M1.

At step 503, the computing node 20a determines runtime conditions for processing and communicating sensor data and commands. Runtime conditions are conditions that may affect the processing of sensor data and control of actuators. Runtime conditions may be associated with transmitting sensor data or transmitting commands for controlling actuators in the wireless networks, such as bit error rate on a communication channel, bandwidth, delay, etc. Another example of a runtime condition may be remaining battery life for a sensor, actuator, or even a computing node. If a runtime condition falls below a predetermined threshold, then execution of a function, such as the function f1, may be delayed or stopped. For example, if the computing node 20a determines that a communications channel with certain metal detection sensors has a high bit error rate, the computing node 20a may decide not to collect and process data from those sensors until the channel becomes more stable.

At step 504, the computing node 20a determines whether another computing node is available to provide the same functionality. For example, the computing node 20d is may also be used for processing sensor data for the lobby room type. The computing node 20d is also programmed with the module M1. Thus, if the computing node 20a is not operable to process sensor data using the function f1, for example, as a result of the unavailability of computing resources or undesirable runtime conditions, the computing node 20d may be available to perform the function f1 for the same sensors and actuators. The steps 502-504 may be performed in any order or substantially simultaneously.

At step 505, the computing node 20a determines whether to execute the function f1 designated in the module M1 based on the determinations at the steps 502-504. For example, the computing node 20a identified the sensors and actuators that it is communicating with to perform the function f1, such as performed at step 501. The computing node 20a may desire to delay processing or transmission if computing resources are unavailable or if runtime conditions are undesirable. However, processing or transmission may not be delayed or stopped if another computing node is unavailable to perform the function of the computing node 20b.

Figure 6:
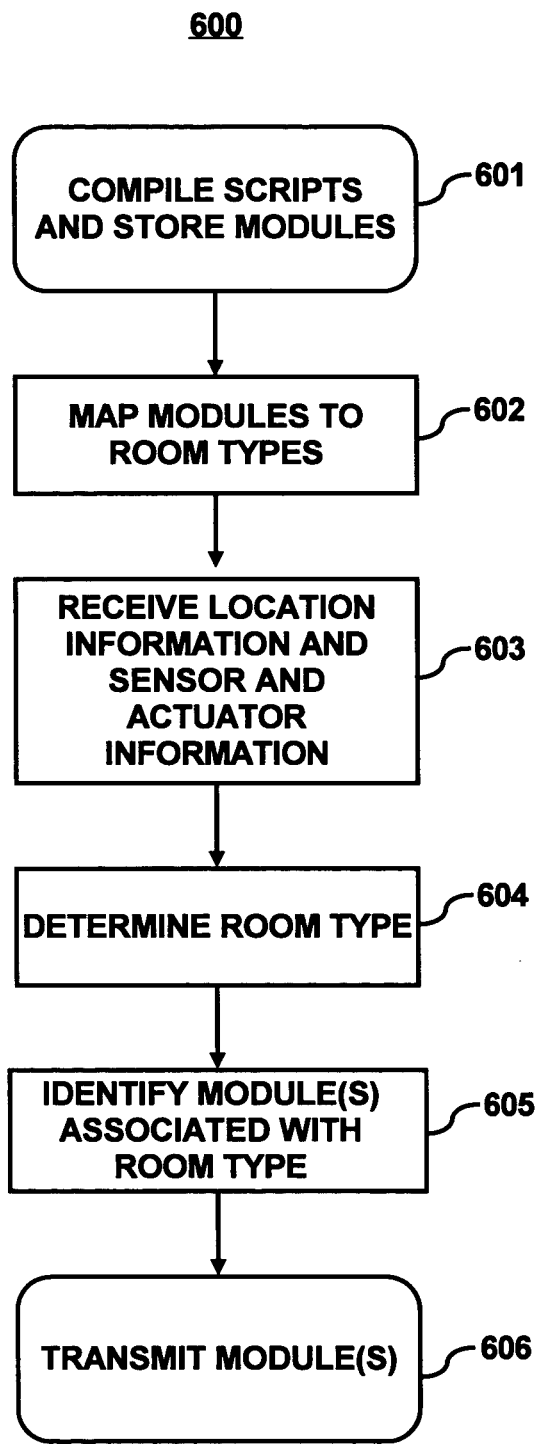
FIG. 6 illustrates a flow chart of a method for identifying modules to transmit to a computing node, according to an embodiment.

FIG. 6 illustrates a method 600 for providing modules to computing nodes, according to an embodiment. The method 600 is described with respect to the system 100 shown in FIGS. 1 and 2 by way of example and not limitation. Furthermore, one or more of the steps of the method 600 may be performed by software, hardware or a combination thereof.

At step 601, the server 10 shown in FIG. 1 compiles scripts and stores modules. For example, the server 10 receives a script designating functions and relationships. The script is compiled to generate a module and the module is stored at the server 10.

At step 602, the server 10 maps the stored modules to room types. In the example shown in FIG. 2, the module M1 is mapped to the lobby room type, and the module M2 is mapped to the lobby room type and court room room type. Mapping may be performed automatically. For example, if the server 10 can identify a room type from a module, such as by the name of the module or a module ID, then the server 10 maps the module to the room type. Alternatively, mapping may be performed by a system administrator that associates the module, for example, based on a description of the module, to a room type.

At step 603, the server 10 receives location information and sensor and actuator information from a computing node. For example, the computing node 20a determines sensors and actuators associated with the computing node 20a through a discovery process. Examples of the sensor and actuator information may include the type of sensors and actuators and/or sensor IDs and actuators IDs for the sensors and actuators connected to the computing node. Also, the computing node 20a determines its location information. The location information may be predetermined and stored in the computing node 20a, such as during installation. In another example, the location information may be automatically determined using location-aware sensors.

At step 604, the server 10 determines the room type for the computing node 20a. For example, the server 10 determines that the computing node 20a is in a lobby based on its location information. The server 10 may store room boundaries for building containing the lobby, and based on the location information determines that the computing node 20a is associated with the lobby room type. The server 10 may also consider the sensor type and actuator type of the sensors and actuators connected to the computing node 20a or a combination of sensor and actuator type and location of the computing node 20a when assigning room type. For example, if the server 10 determines that the computing node 20a is connected to metal detection sensors and automatic door actuators and the computing node 20a is in the vicinity of a lobby, then the server 10 assigns the lobby room type to the computing node 20a.

At step 605, the server 10 identifies modules associated with the room type for the computing node 20a. For example, the server 10 determines that the modules M1 and M2 shown in FIG. 2 are associated with the lobby room type and assigns those modules to the computing node 20a.

At step 606, the server 10 transmits the modules identified at step 605 to the computing node 20a. In certain instances, the server 10 may identify a module that has previously been transmitted to the computing node generating the request. In those instances, the server 10 may retransmit the module, and the computing node may determine that it already installed that module and deletes the received module. Alternatively, the server 10 may keep track of the modules previously transmitted to the computing node to minimize the possibility of subsequently transmitting the same module to the computing node.

The steps 601-606 may be repeated as needed. For example, at step 601, the server 10 may map new modules as they are received. Also, one or more of the steps 602-605 may be repeated for each request that is received by the server 10.

Figure 7:
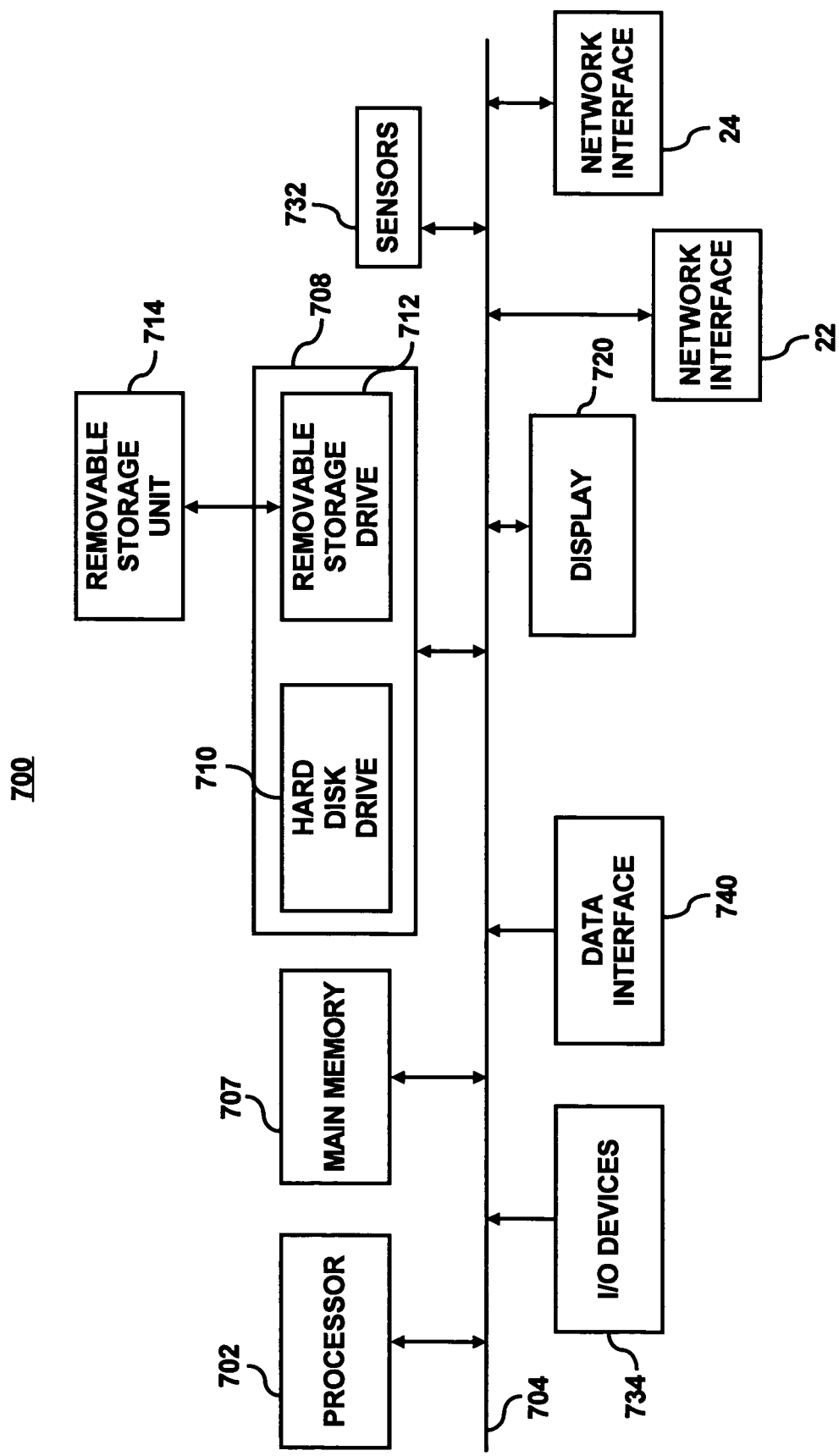
FIG. 7 illustrates a block diagram of a computing node, according to an embodiment.

FIG. 7 illustrates a block diagram of a computing node 700, such one of the computing nodes 20 shown in FIG. 1, according to an embodiment. The software for the computing node 20 including modules downloaded from the server 10 shown in FIG. 1 and software for performing one or more of the steps in the methods 400-600 may be executed by the computing node 700. The computing node 700 includes one or more processors, such as processor 702. Commands and data from the processor 702 are communicated over a communication bus 704. The computing node 700 also includes a main memory 706, such as a random access memory (RAM), where the program code for the modules and other software may be executed during runtime, and a secondary memory 707. The secondary memory 707 includes, for example, one or more hard disk drives 710 and/or a removable storage drive 712, representing a floppy diskette drive, a magnetic tape drive, a compact disk drive, etc., where a copy of the program code may be stored. The removable storage drive 710 reads from and/or writes to a removable storage unit 714 in a well-known manner. User input and output devices 734 may include a keyboard, a mouse, or a joystick, a touch pad, a display 720, and the like.

The computing node 700 may include two wireless network interfaces 22 and 24. The network interface 22 may be used to communicate with computing nodes in the computing node network 110. The network interface 24 may be used to communicate with sensors and actuators in the sensor networks 120a and 120b shown in FIG. 1. Also, a data interface 740, such as a USB port, serial port, infra-red or radio frequency interface, etc., is provided for communicating with local sensors or actuators connected to the computing node 700 via the data interface 740. Sensors 732 are provided for determining runtime conditions and determining availability of computing resources. The sensors 732 may be embodied in software, hardware or a combination thereof. It will be apparent to one of ordinary skill in the arts that other known electrical components may be added or substituted in the computing node 700. Also, one or more of the components in FIG. 7 may be optional.

One or more of the steps of the methods 400-600 may be implemented as software embedded on a computer readable medium, such as the memory 706 and/or 708. The steps may be embodied by a computer program, which may exist in a variety of forms both active and inactive. For example, they may exist as software program(s) comprised of program instructions in source code, object code, executable code or other formats for performing some of the steps. Any of the above may be embodied on a computer readable medium, which include storage devices and signals, in compressed or uncompressed form.

Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated below may be performed by any electronic device capable of executing the above-described functions.

What has been described and illustrated herein are the embodiments. The terms, descriptions and figures used herein are set forth by way of illustration only and are not meant as limitations. Those skilled in the art will recognize that many variations are possible within the spirit and scope of the embodiments.

What is claimed is:

1. A method comprising:
   determining location information for a computing node connected to a sensor and an actuator, wherein the location information includes a geographic location of the computing node within a predetermined geographic area and the predetermined geographic area includes a plurality of predetermined areas within the predetermined geographic area;
   transmitting the location information to a server remote from the computing node via a network;
   receiving a module at the computing node from the remote server via the network, wherein the module is a module of a plurality of modules, each module being associated with a predetermined area of the plurality of areas, and the received module is selected from the plurality of modules based on a predetermined area of the plurality of predetermined areas identified using the location information for the computing node; and
   programming the computing node using the received module to perform a function associated with the sensor and the actuator.

2. The method of claim 1, further comprising:
   transmitting the location information to a server further comprises transmitting information associated with the sensor and actuator connected to the computing node to the server, such that the server is operable to select the module from the plurality of modules using at least one of the location information and the information associated with the sensor and actuator.

3. The method of claim 1, wherein receiving a module comprises receiving a module associated with a room type for the computing node.

4. The method of claim 1, wherein programming the computing node comprises at least one of compiling, installing, and executing the module at the computing node.

5. The method of claim 1, further comprising:
   executing the module to perform the function.

6. The method of claim 1, further comprising:
   determining at least one of an availability of computing resources at the computing node, runtime conditions, and redundant functionality in a system including the computing node, sensor and actuator; and
   based on the determination of at least one of the availability of the computing resources, the runtime conditions, and the redundant functionality, determining whether to perform (1) receiving data from the sensor, (2) processing data from the sensor using the function, and (3) determining whether to control the actuator.

7. The method of claim 1, further comprising:
   identifying the sensor based on information in the module;
   receiving data from the sensor;
   processing data from the sensor using the function; and
   determining whether to control the actuator based on the function.

8. The method of claim 7, wherein the information comprises a relationship identifying the sensor and the actuator.

9. The method of claim 1, further comprising:
   communicating with the sensor and the actuator via a wireless network.

10. A method comprising:
    receiving via a network location information for a computing node and information associated with sensors and actuators connected to the computing node, wherein the location information includes a geographic location of the computing node within a predetermined geographic area and the predetermined geographic area includes a plurality of predetermined areas within the predetermined geographic area;
    identifying a predetermined area of the plurality of predetermined areas associated with the computing node based on the location information for the computing node within the predetermined geographic area;
    selecting, from a plurality of modules stored within the server, a module associated with the identified predetermined area and the information associated with sensors and actuators connected to the computing node; and
    transmitting the module from the server to the computing node via the network.

11. The method of claim 10, wherein selecting a module comprises:
    determining a room type for the computing node based on at least one of the location information and the information associated with sensors and actuators connected to the computing node; and
    selecting the module from the plurality of modules, wherein the module is associated with the room type for the computing node.

12. The method of claim 11, further comprising:
storing the plurality of modules; and
mapping the plurality of modules to room types.

13. The method of claim 10, further comprising:
receiving software including instructions for performing a function and a relationship associated with a sensor and an actuator; and
compiling the software to generate the module.

14. The method of claim 10, wherein the information associated with sensors and actuators comprises at least one of sensor types and actuator types for sensors and actuators connected to the computing node and sensor IDs and actuator IDs for sensors and actuators connected to the computing node.

15. The method of claim 10, wherein the module comprises a function associated with a sensor and an actuator connected to the computing node.

16. The method of claim 15, wherein the module comprises a relationship identifying the sensor and the actuator.

17. An apparatus comprising:
a computing node connected to at least one sensor, at least one actuator, and a server via a network; wherein
the computing node is operable to receive a module from the server via the network and execute the module to perform a function associated with the at least one sensor and the at least one actuator, and
wherein the computing node is operable to determine location information for the computing node and information associated with sensors and actuators connected to the computing node, and the location information includes a geographic location of the computing node within a predetermined geographic area and the predetermined geographic area includes a plurality of predetermined areas within the predetermined geographic area,
such that the server is operable to determine a predetermined area of the plurality of predetermined areas associated with the location information and select the module from a plurality of modules based on the predetermined area and the information associated with the at least one sensor and the at least one actuator.

18. The apparatus of claim 17, wherein the computing node is operable to determine at least one of an availability of computing resources at the computing node, runtime conditions, and whether another computing node is available to provide the same functionality as the computing node; and
based on the determination of at least one of the availability of the computing resources, the runtime conditions, and whether another computing node is available to provide the same functionality as the computing node, determining whether to perform at least one of (1) receiving data from the at least one sensor, (2) processing data from the at least one sensor using the function, and (3) determining whether to control the at least one actuator.

19. The apparatus of claim 18, wherein the module includes instructions for performing the function, wherein the function includes processing data from the at least one sensor to control the at least one actuator.

20. A computing node comprising:
means for determining location information for a computing node connected to a sensor and an actuator, wherein the location information includes a geographic location of the computing node within a predetermined geographic area and the predetermined geographic area includes a plurality of predetermined areas within the predetermined geographic area;
means for receiving a module at the computing node from a remote server via a network, wherein the module is a module of a plurality of modules, each module being associated with a predetermined area of the plurality of areas, and the received module is selected from the plurality of modules based on a predetermined area of the plurality of predetermined areas identified using the location information for the computing node; and
processor means for executing the module to process the sensor data.

21. The computing node of claim 20, further comprising:
means for determining information associated with the sensor and actuator connected to the computing node, wherein the information is used to select the module from a plurality of modules.

22. The computing node of claim 20, further comprising:
means for determining at least one of an availability of computing resources at the computing node, runtime conditions, and whether another computing node is available to provide the same functionality as the computing node; and
based on the determination of at least one of the availability of the computing resources, the runtime conditions, and whether another computing node is available to provide the same functionality as the computing node, the processing means determines whether the computing node performs at least one (1) receiving data from the sensor, (2) processing data from the sensor using the function, and (3) determining whether to control an actuator.

23. The computing node of claim 20, further comprising:
a first network interface means for connecting the computing node to another computing node via a first wireless network; and
a second network interface means for connecting the computing node to the sensor via a second wireless network.

24. A system comprising:
a plurality of computing nodes connected to a plurality of sensors and a plurality of actuators via a first wireless network;
a server storing a plurality of modules and connected to the plurality of computing nodes, wherein the server is operable to identify for each of the plurality of computing nodes a module associated with a respective computing node and transmit the identified modules to the plurality of computing nodes for programming the computing nodes,
wherein each of the identified modules is identified by
determining location information for the respective computing node and the location information includes a geographic location of the computing node within a predetermined geographic area and the predetermined geographic area includes a plurality of predetermined areas within the predetermined geographic area,
determining a predetermined area of the plurality of predetermined areas associated with the location information, and
selecting, from the plurality of modules, a module associated with the predetermined area.

25. The system of claim 24, wherein the plurality of modules include functions to be performed by at least one of the plurality of computing nodes; the functions including processing instructions for processing sensor data from at least one of the plurality of sensors to control at least one actuator of the plurality of actuators.

26. The system of claim 25, further comprising:
a second wireless network connecting the plurality of computing nodes, wherein the second wireless network includes transmission ranges that exceed the first wireless network.

27. The system of claim 26, further comprising:
a third network connecting the plurality of computing nodes to the server.

28. A sensor comprising:
a device operable to detect a condition associated with an environment in a vicinity of the device, wherein the device is connected to at least one computing node that is programmed by a module received from a server, the module being used to process sensor data from the device to control an actuator connected to the computing node and the module is selected from a plurality of modules using location information for the at least one computing node, location information for the sensor wherein the location information includes a geographic location of the computing node within a predetermined geographic area and the predetermined geographic area includes a plurality of predetermined areas within the predetermined geographic area, and a predetermined area of the plurality of predetermined areas associated with the location.

* * * * *